US012258787B2

(12) United States Patent
Dingemans et al.

(10) Patent No.: US 12,258,787 B2
(45) Date of Patent: Mar. 25, 2025

(54) VANDAL-PROOF MECHATRONIC LOCK SYSTEM

(71) Applicant: Bold Security Technology B.V., Utrecht (NL)

(72) Inventors: Antonius Dingemans, SB Utrecht (NL); Thomas Van Beek, SB Utrecht (NL)

(73) Assignee: BOLD SECURITY TECHNOLOGY B.V., Utrecht (NL)

( * ) Notice: Subject to any disclaimer, the term of this patent is extended or adjusted under 35 U.S.C. 154(b) by 121 days.

(21) Appl. No.: 17/781,628

(22) PCT Filed: Nov. 30, 2020

(86) PCT No.: PCT/NL2020/050746

§ 371 (c)(1),
(2) Date: Jun. 1, 2022

(87) PCT Pub. No.: WO2021/112668

PCT Pub. Date: Jun. 10, 2021

(65) Prior Publication Data

US 2023/0046991 A1 Feb. 16, 2023

(30) Foreign Application Priority Data

Dec. 2, 2019 (NL) ..................................... 2024354

(51) Int. Cl.
*E05B 47/00* (2006.01)
*E05B 35/00* (2006.01)
(Continued)

(52) U.S. Cl.
CPC ........ *E05B 47/0012* (2013.01); *E05B 35/008* (2013.01); *E05B 47/0615* (2013.01);
(Continued)

(58) Field of Classification Search
CPC ............... E05B 47/0012; E05B 35/008; E05B 47/0615; E05B 47/0642; E05B 2047/0095; G07C 9/00174; G07C 9/00944
See application file for complete search history.

(56) References Cited

U.S. PATENT DOCUMENTS 9,822,553 B1 * 11/2017 Ho ........................ E05B 47/026
10,125,519 B1 * 11/2018 Gengler .............. E05B 47/0611
(Continued)

FOREIGN PATENT DOCUMENTS

CN 110094113 A 8/2019
NL 2018222 B1 2/2018

*Primary Examiner* — Mark A Williams
(74) *Attorney, Agent, or Firm* — Procopio, Cory, Hargreaves & Savitch LLP

(57) ABSTRACT

The present invention relates generally to mechatronic locks and more specifically, and preferably, wireless mechatronic smart lock systems for locking doors which can be operated by a mechanical tool after positive authentication of the user. In a first aspect, there is provided a mechatronic lock system arranged for actuating a door lock operating member for locking and unlocking a door upon activation of said system comprising: an outside lock interface, comprising means for receiving a mechanical tool, arranged for operating said door lock operating member by a user of said lock system upon receiving said mechanical tool; an inner assembly, comprising: a wireless communication unit, arranged for wireless communication with a wireless communication device for authorizing said user; a control unit, in communicative connection with said wireless communication unit and arranged to activate said system for unlocking said door by activating a mechatronic clutch arranged for coupling said outside lock interface to said door lock operating member;
(Continued)

wherein said mechatronic clutch is activated upon positive authorization of said user for opening said door by operating said outside lock interface.

13 Claims, 2 Drawing Sheets

(51) Int. Cl.
*E05B 47/06* (2006.01)
*G07C 9/00* (2020.01)

(52) U.S. Cl.
CPC ...... *E05B 47/0642* (2013.01); *G07C 9/00174* (2013.01); *G07C 9/00944* (2013.01); *E05B 2047/0095* (2013.01)

(56) References Cited

U.S. PATENT DOCUMENTS

| | | | | |
|---|---|---|---|---|
| 2004/0040355 | A1* | 3/2004 | Goldman | E05B 47/0615 70/277 |
| 2014/0292481 | A1* | 10/2014 | Dumas | G07C 9/28 340/5.61 |
| 2015/0300043 | A1* | 10/2015 | van Buynder | E05B 47/063 70/393 |
| 2017/0051533 | A1* | 2/2017 | Kester | G07C 9/00182 |
| 2017/0053467 | A1* | 2/2017 | Meganck | G07C 9/00563 |
| 2017/0186256 | A1* | 6/2017 | Dumas | H04B 17/318 |
| 2017/0243425 | A1* | 8/2017 | Meganck | G07C 9/00174 |
| 2017/0306652 | A1* | 10/2017 | Guo | E05B 17/045 |
| 2018/0108192 | A1* | 4/2018 | Ho | G07C 9/253 |
| 2019/0145130 | A1* | 5/2019 | Affan | E05B 47/026 292/144 |
| 2019/0218826 | A1* | 7/2019 | Allen | G07C 9/00174 |

* cited by examiner

VANDAL-PROOF MECHATRONIC LOCK SYSTEM

CROSS-REFERENCE TO RELATED APPLICATIONS

This application is US National Stage of International Patent Application PCT/NL2020/050746, filed Nov. 30, 2020, which claims benefit of priority from Netherland Patent Application NL2024354, filed Dec. 2, 2019, the contents of both of which are incorporated herein by reference.

TECHNICAL FIELD

The present invention relates generally to mechatronic locks and more specifically, and preferably, wireless mechatronic smart lock systems for locking doors which can be operated by a mechanical tool after positive authorization of the user.

BACKGROUND

Mechatronic smart lock systems, typically referred to as smart locks, are known and widely applied in various access control applications. Compared to traditional mechanical locks, smart locks are flexible in access control configuration over time and encompassing large numbers of users. Like the traditional locks, smart locks need two main parts: the lock and the key. However, smart locks are not controlled by a physical key but by a wireless portable device e.g. a smartphone, smart watch or a special key fob configured explicitly for performing the authorization needed to automatically unlock the lock. Some smart locks are configured with a physical keyhole as a backup system for performing locking and unlocking operations.

A state-of-the-art mechatronic smart lock system is for example known from NL2018222B1. In this application a system is disclosed for which the lock is manually operated by an outer knob after positive authorization of the user using a wireless connection.

The main disadvantage of such a system is that the lock protrudes the outside of the door surface which makes it vulnerable to damages and/or vandalism. To overcome this problem, the outer protruding parts may be repositioned to the inside with a motorized operation of the lock. There are several disadvantages to such a solution. First, power consumption is relatively high with motor operated locks, which is very undesired especially for battery power operated devices. Second, in some cases a large force is needed for operating the door lock, which leads to the need of very large motors or even to events in which a specific motor is not able to open the lock. Thirdly, such solutions result in significant increase in costs and complexity and will adversely affect the robustness.

SUMMARY

It is therefore an object of the present disclosure to provide an improved mechatronic lock system which obviates the above-mentioned drawbacks.

It is a further object of the present disclosure to provide an improved mechatronic lock system which is robust, simple and not prone to vandalism and/or tampering.

In a first aspect, there is provided a mechatronic lock system arranged for actuating a door lock operating member for locking and unlocking a door upon activation of said system comprising:

- an outside lock interface, comprising means for receiving a mechanical tool, arranged for operating said door lock operating member by a user of said lock system upon receiving said mechanical tool;
- an inner assembly, comprising:
  - a wireless communication unit, arranged for wireless communication with a wireless communication device for authorizing said user;
  - a control unit, in communicative connection with said wireless communication unit and arranged to activate said system for unlocking said door by activating a mechatronic clutch arranged for coupling said outside lock interface to said door lock operating member;
- wherein said mechatronic clutch is activated upon positive authorization of said user for opening said door by operating said outside lock interface.

Lock systems have two main functions, one is the authorization, e.g. only authorized persons should be able to actuate the system to lock and unlock the door. The other one is the operation. The door is a hinged, sliding, or revolving barrier at the entrance to a building, room, vehicle, box or other enclosed space.

On the one hand, there is a first type of conventional lock systems having a door lock operating member arranged for operating the door lock, wherein the door lock is the mechanical element for securing or fastening the door. This type of lock system is typically used in entrance doors of residential buildings. Here the door lock is fixed to the door and the door lock operating member is integrated to a (lock) cylinder, which can easily be inserted and removed from the door. The door lock operating member interfaces with the door lock for locking and/or unlocking the door.

On the other hand there is a second type of conventional lock systems for which the door lock is integrated to and/or mechanically connected to the door lock operating member of the mechanical lock system, like for example in cam lock or rim lock systems.

The mechatronic lock systems of the current invention can be applied to both types of conventional lock systems. For the first type of conventional lock systems typically the (lock) cylinder is replaced by a mechatronic lock system of the current invention. For the second type of conventional lock systems the complete lock system is replaced by mechatronic lock system of the current invention, including the door lock.

The door lock can thus either be operated directly or operated indirectly by means of the door lock operating member. In both cases the purpose is to lock or unlock the door.

The door can only be opened if it is unlocked. The door is unlocked if the door lock is actuated. Once the door lock has been actuated the door can be opened by operating a knob or a door handle.

In the present disclosure, these two functions of mechanically operating and mechatronically actuating are isolated from each other.

The mechatronic actuation is done through a wireless communication with a wireless communication device. The wireless communication device may for example be a key fob, but also a mobile communication device like a smartphone or dedicated portable hardware. The wireless communication device may comprise authentication means to identify the user, but this is not required. The wireless communication device may also be generic in which multiple (authorized) users have a wireless communication device with the same coded or encrypted signal or data.

If the wireless communication unit receives a coded signal from the wireless communication device it communicates with the control unit which decodes and checks the signal to determine if authorization has been successful. If this is the case, the control unit activates a mechatronic clutch. The clutch either couples or decouples the outside lock interface with the door lock operating member. If the clutch is decoupled, the user may operate the outside lock interface, e.g. by rotating an outer knob or another mechanical tool, but the knob will rotate freely. Only in a coupled state, the rotating of such an outer knob will enable the user to operate the door.

If the user is not successfully authorized, and thus no actuation of the system has taken place, the mechanical operation of the door e.g. rotating a door knob or pushing a door lever, is thus prevented. If on the other hand the user is successfully authorized the system will be arranged for operation and opening of the door. To this end however, the user may need an additional mechanical tool. The additional tool and the outside lock interface have mutually complementing shapes. The mechanical tool can thus be coupled to the outside lock interface such that a complete lock system is obtained. The mechanical tool therefore replaces the conventional outside lock elements which are used to operate the door.

Having a detachable outside lock part in the form of a mechanical tool is advantageous since this enables the system to have no external protruding parts. These parts are the parts that are the most vulnerable for damages and/or vandalism. As such, the robustness of the lock is significantly increased without adding complex elements which makes the lock system according to the present disclosure simple and low in terms of production costs. The lock system according to the present disclosure is also advantageous over known smart locks since the detachable mechanical tool obviates the need to motorize the lock system. In an example, said outside lock interface comprises a first shaft and said door lock comprises a second shaft, wherein said first and second shaft are positioned parallel and at least partially overlapping in the axial direction and wherein said mechatronic clutch is arranged for coupling said first shaft to second shaft upon said positive authorization of said user.

Upon positive authorization of the user, the mechatronic clutch couples the first shaft to the second shaft. The outside lock interface is integrated with and/or mechanically connected to the first shaft. The second shaft is either integrated with and/or mechanically connected to the door lock operating member or interfacing and/or indirectly operating the door lock. The user can now open the door by operating the outside lock interface by the mechanical tool and thereby operating the door lock. In case of negative or no authorization, the outside lock interface is not coupled to the door lock, so an unauthorized user is not able to open the door. In this case the first shaft rotates freely with respect to the second shaft and/or to the door. This is advantageous over known smart locks and mechanical locks since the free rotation of the lock ensures the lock is extremely vandal and burglar proof, because the door lock cannot be forced to be operated in case of unauthorized use, neither by brute force nor by core pulling of the cylinder.

In an example, said outside lock interface does not protrude the outside surface of the door.

In another example, said outside lock interface protrudes the outside surface of the door by less than several cm, preferably, less than 1 cm, more preferably, less than 3 mm.

Preferably, the outside lock interface does not protrude the outside surface of the door preventing damaging the lock system from outside. In case the lock system does protrude the door surface, e.g. for esthetical reasons, the outside lock interface preferably is as thin as possible.

In an example, said mechanical tool is a generic mechanical tool.

A generic mechanical tool can easily be obtained ensuring simple operation of the door lock upon positive authorization of the user, without the need of fixed door knobs or levers.

In an example, said mechanical tool is a key.

The key can be used for mechanical purpose only as a blank key, where the key is not authenticated at the interface. For extra safety the door lock is even more secure when the mechanical tool is a key for an extra authentication and/or authorization step at the outside lock interface. The key is in possession of only one user or a restricted number of users.

In an example, said mechanical tool is an outer door knob. An outer knob that can be removed from the outside lock interface can also be used to transfer the manual power to the door lock for opening the door.

In an example, said mechanical tool and said means for receiving said mechanical tool comprise mutually complementing shapes.

In order to transfer the force applied manually by the user to the door lock to be operated, the mechanical tool and the means for receiving the mechanical tool have mutually complementing shapes. For example these mutually complementing shapes are square, triangle, or rectangular shaped.

In an example, said mutually complementing shape of said means for receiving said mechanical tool are arranged in the circumference of said outside lock interface.

In another example, said mutually complementing shape of said means for receiving said mechanical tool are arranged in the centre of said outside lock interface.

In order of easy reception of the mechanical tool the mutually complementing shape are arranged in the circumference of the outside door lock interface. In order of easy operation of the door lock upon positive authorization of the user, the mutually complementing shape are arranged in the centre of the outside door lock interface.

In an example, said wireless communication device comprises a key fob, keypad, a Radio Frequency Identification, RFID, module and/or a biometric identification device.

The wireless communication device which enables the lock system in determining whether a certain user is authorized to operate the door lock, is a key fob, a (numeric) keypad and/or a RFID module which is able to wirelessly connect to the inner assembly of the lock system. The specific key fob or a numeric code can easily be transferred from one user to another for authorized operation of the lock system. The wireless communication device can furthermore be biometric identification device, for example a device arranged for iris, face, fingerprint and/or retina recognition.

In another example, said wireless communication device comprises a mobile user equipment, and in particular a smart phone, tablet, smartwatch and/or other wearable device.

Furthermore, the wireless communication device is a mobile user equipment, like a smart phone, tablet, smart wearable, portable computer and/or other personal handheld device. This user equipment can replace, or can be used additionally to the special hardware needed in case of a key fob or numerical keypad. The mobile user equipment communicates with an encoded signal over a wireless communication channel with the inner assembly of the lock system.

The mobile user equipment on his own can easily be provided with security, special applications and/or updates.

In yet another example, said wireless communication device is a network gateway and/or another local controller, switch, router, bridge or other computing device for relaying network carried communication from a network connected device and/or software.

The above-mentioned and other features and advantages of the invention are illustrated in the following description with reference to the enclosed drawings which are provided by way of illustration only and which are not limitative to the present invention.

DETAILED DESCRIPTION

Figure 1A:
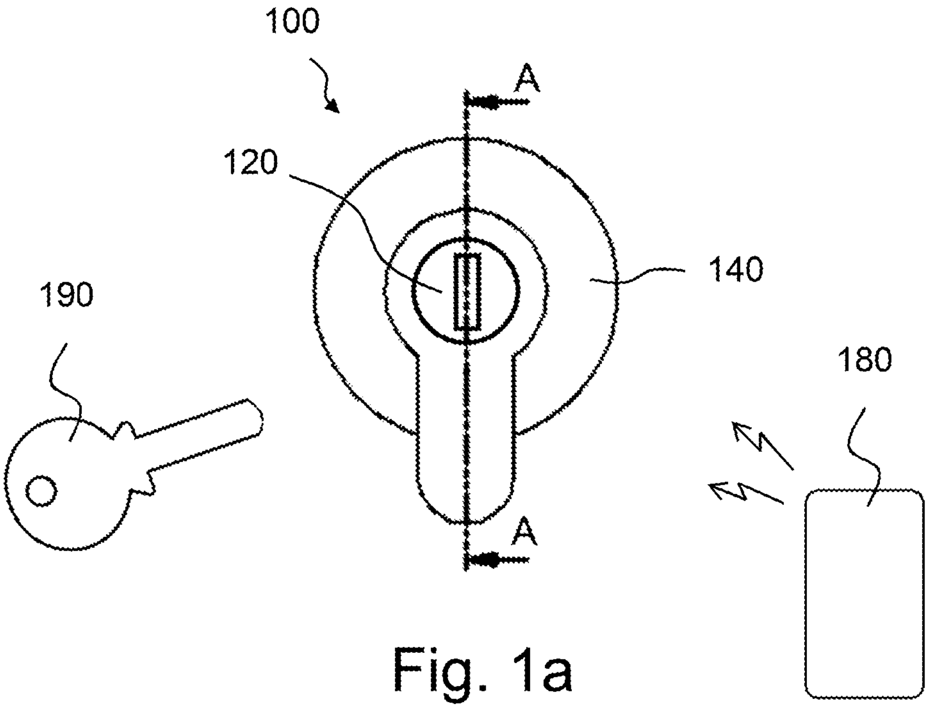
FIG. 1 shows, in an illustrative manner, a front view and an internal view of the mechatronic lock system in accordance with the invention.

FIG. 1*a* shows, in an illustrative manner, a front view of the mechatronic lock system (100) in accordance with the invention.

In order to operate the mechatronic lock system (100), a wireless communication unit inside the inner assembly (140) communicates with the wireless communication device (180) to check whether or not the user is authorized to operate the door lock. The wireless communication device (180) is available for the user and can be a mobile phone, tablet, smart watch or the like, and/or a dedicated key fob or numeric keypad. Upon positive authorization of the user, the door can be unlocked by the user by applying the mechanical tool (190) to the means for receiving a mechanical tool (120) in order to manually transfer the force to the door lock. When the user is not authorized to operate the door lock, the mechanical tool (190) and the means for receiving a mechanical tool (120) rotate freely without operating the door lock. This results in a door lock that is not prone to vandalism and mechanical and/or electrical tampering.

Figure 1B:
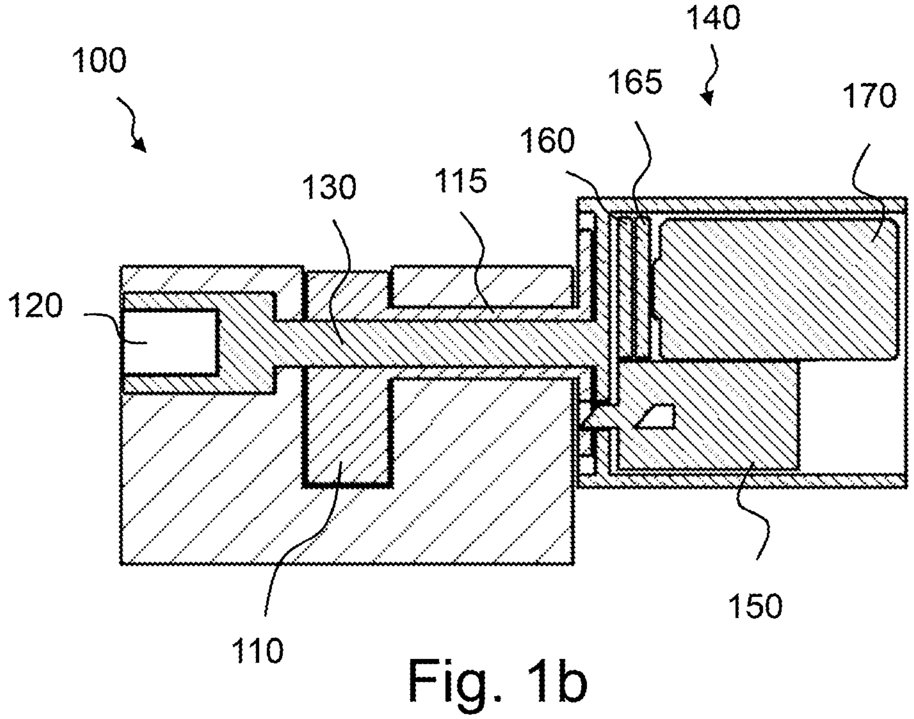

FIG. 1*b* shows, in an illustrative manner, an internal view along section A-A of FIG. 1*a* of the mechatronic lock system (100) in accordance with the invention.

The mechatronic lock system (100) does not protrude the outside surface of the door (not showed) which makes the door lock extremely invulnerable for vandalism and mechanical tampering. Because all electronic parts are placed in the inner assembly (140) the door lock system is furthermore extremely invulnerable for tampering and damaging the electronic part of the system.

In the inner assembly (140) a wireless communication unit (160), a control unit (165) an energy accumulator (170) and the mechatronic clutch (150) is placed. In this example the inner assembly is mechanically connected and/or integrated with a first shaft (130). At the outside part of the door, first shaft (130) is mechanically connected and/or integrated with the means for receiving a mechanical tool (120). The door lock operating element (110) is mechanically connected and/or integrated with a second shaft (115). Both shafts are positioned parallel and at least partially overlapping in the axial direction.

The wireless communication unit (160) which communicates with the wireless communication device (180) of the user. When the user wants to operate the door lock, the control unit (165), which is in communicative connection with the wireless communication unit (160), controls whether or not the user is authorized to operate the door lock. Upon positive authorization, the control unit (165) activates the lock system for unlocking the door lock by activating the mechatronic clutch (150) for coupling the first shaft with the second shaft and thereby coupling the outside lock interface to the door lock operating member (110). By applying the mechanical tool (190) to the outside lock interface, the door can be manually opened by the user.

When the control unit decides that the user is not authorized to operate the door lock, the mechatronic clutch (150) is not activated and the shafts are not coupled. In this case when an unauthorized user applies the mechanical tool (190) to the outside lock interface, the door lock operating member (110) and thus the door lock cannot be operated and the door cannot be opened. Instead, the first shaft (130) and the mechanical tool (190) rotate freely without transferring any force to the second shaft (115) and the door lock operating member (110).

The energy accumulator (170), for example a battery, provides the electronic part of the mechatronic lock system with power. The door lock is not motorized, but needs to be manually operated to open the door lock. This results in an extremely energy efficient system.

Figure 2A:
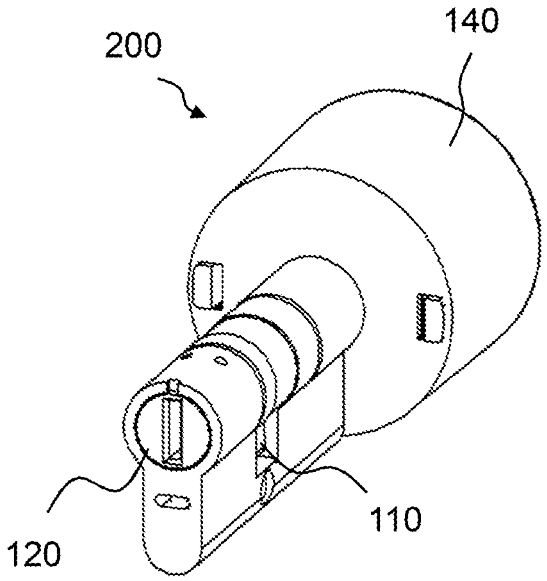
FIG. 2 shows three different examples of mutually complementing shapes of the means for receiving the mechanical tool in accordance with the invention.
Figure 2B:
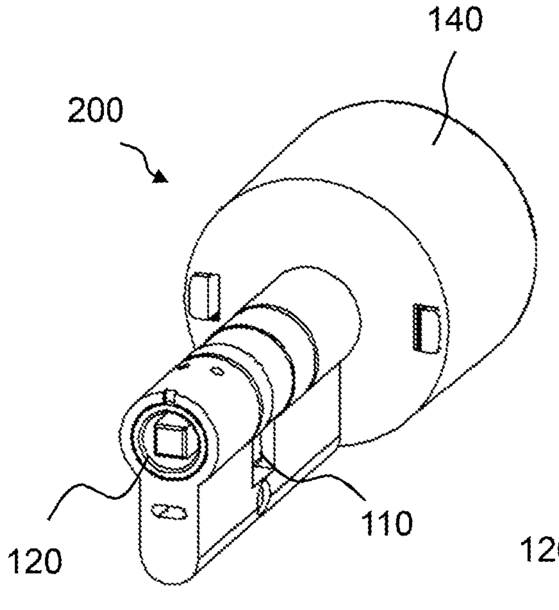
Figure 2C:
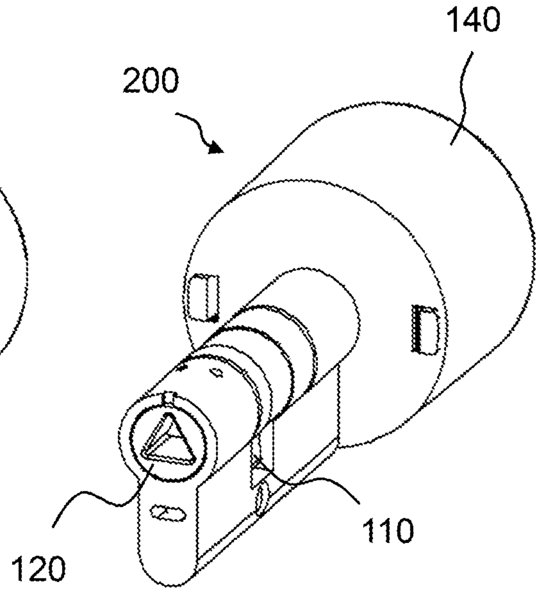

FIGS. 2*a-c* show three different examples of mutually complementing shapes of the means for receiving the mechanical tool in accordance with the invention. The door lock operating member (110) is arranged for actuating the door lock (not showed) for locking and/or unlocking the door.

FIG. 2*a* shows a mechatronic lock system (200) for which the mutually complementing shapes of the mechanical tool (not showed) and the means for receiving the mechanical tool (120) at the outside lock interface are rectangular shaped.

FIG. 2*b* shows a mechatronic lock system (300) for which the mutually complementing shapes of the mechanical tool (not showed) and the means for receiving the mechanical tool (120) at the outside lock interface are square shaped slot.

FIG. 2*c* shows a mechatronic lock system (400) for which the mutually complementing shapes of the mechanical tool (not showed) and the means for receiving the mechanical tool (120) at the outside lock interface are triangular shaped.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope thereof.

The invention claimed is:

1. A mechatronic lock system arranged for actuating a door lock operating member for locking and unlocking a door upon activation of said system, the mechatronic lock system comprising:

an outside lock interface, comprising an interface configured to receive a mechanical tool for engaging a mechanical actuator of the mechatronic lock system, wherein the mechanical tool does not serve as an authentication mechanism;

an inner assembly, comprising:

a wireless communication unit, arranged for wireless communication with a wireless communication device for authorizing a user; and a control unit, in communicative connection with said wireless communication unit and arranged to activate said system for unlocking said door by activating a mechatronic clutch arranged for coupling said outside lock interface to said door lock operating member, wherein said mechatronic clutch is activated upon positive authorization of said user for opening said door by operating said outside lock interface.

2. The mechatronic lock system according to claim 1, wherein said outside lock interface comprises a first shaft, and said door lock operating member comprises a second shaft, wherein said first shaft and second shaft are positioned parallel to each other and at least partially overlapping each other in an axial direction, and wherein said mechatronic clutch is arranged for coupling said first shaft to second shaft upon said positive authorization of said user.

3. The mechatronic lock system according to claim 1, wherein said outside lock interface does not protrude an outside surface of the door.

4. The mechatronic lock system according to claim 1, wherein said outside lock interface protrudes an outside surface of the door by less than several cm, preferably, less than 1 cm, more preferably, less than 3 mm.

5. The mechatronic lock system according to claim 1, wherein said mechanical tool is a mechanical tool without specific identifying features.

6. The mechatronic lock system according to claim 1, wherein said mechanical tool is a key.

7. The mechatronic lock system according to claim 1, wherein said mechanical tool is a door knob, which when rotated, mechanically couples with the lock actuator to enable unlocking.

8. The mechatronic lock system according to claim 1, wherein said mechanical tool and said interface for receiving said mechanical tool comprise mutually complementing shapes.

9. The mechatronic lock system according to claim 8, wherein said mutually complementing shape of said means for receiving said mechanical tool are arranged in a circumference of said outside lock interface.

10. The mechatronic lock system according to claim 8, wherein said mutually complementing shape of said means for receiving said mechanical tool are arranged in a center of said outside lock interface.

11. The mechatronic lock system according to claim 1, wherein said wireless communication device comprises a key fob, a keypad, a Radio Frequency Identification, RFID, module and/or a biometric identification device.

12. The mechatronic lock system according to claim 1, wherein said wireless communication device comprises a mobile user equipment, and in particular a smart phone, tablet, smartwatch and/or other wearable device.

13. The mechatronic lock system according to claim 1, wherein said wireless communication device comprises a network gateway.

* * * * *